(12) United States Patent
Lin

(10) Patent No.: US 7,512,325 B2
(45) Date of Patent: Mar. 31, 2009

(54) METHOD AND APPARATUS FOR MPEG VIDEO PROCESSING

(75) Inventor: Tzu-Ping Lin, Pingtung (TW)

(73) Assignee: Mediatek Inc., Hsin-Chu (TW)

( * ) Notice: Subject to any disclaimer, the term of this patent is extended or adjusted under 35 U.S.C. 154(b) by 1150 days.

(21) Appl. No.: 10/338,387

(22) Filed: Jan. 8, 2003

(65) Prior Publication Data

US 2003/0128968 A1    Jul. 10, 2003

(30) Foreign Application Priority Data

Jan. 9, 2002   (TW) .............................. 91100207 A

(51) Int. Cl.
*H04N 7/26* (2006.01)
*H04N 5/91* (2006.01)

(52) U.S. Cl. ........................ 386/124; 386/46

(58) Field of Classification Search ............ 375/240.27, 375/240.25; 386/111

See application file for complete search history.

(56) References Cited

U.S. PATENT DOCUMENTS

| | | | |
|---|---|---|---|
| 5,903,312 A * | 5/1999 | Malladi et al. ......... | 375/240.03 |
| 6,330,365 B1 * | 12/2001 | Yasuda et al. ............... | 382/233 |
| 6,415,055 B1 * | 7/2002 | Kato ........................... | 382/236 |
| 6,810,080 B1 * | 10/2004 | Wise ..................... | 375/240.15 |
| 2002/0114395 A1 * | 8/2002 | Owen et al. ............ | 375/240.18 |
| 2003/0002584 A1 * | 1/2003 | Campisano et al. .... | 375/240.21 |

* cited by examiner

*Primary Examiner*—Marsha D Banks Harold
*Assistant Examiner*—Oluwaseun A Adegeye
(74) *Attorney, Agent, or Firm*—Thomas, Kayden, Horstemeyer & Risley

(57) ABSTRACT

A method and an apparatus for processing a motion picture expert group (MPEG) video, used in a video reproduction apparatus, can prevent a non-reference picture displaying error due to the non-reference picture decoding not completed in time. The apparatus includes a video decoder for generating a non-reference picture on a macroblock-by-macroblock basis by referring to a reference picture; a displaying unit for displaying the non-reference picture on the macroblock-by-macroblock basis. The displaying unit further detects whether decoding of a next macroblock of the non-reference picture is completed when displaying a current macroblock. If decoding of the next macroblock is completed, the displaying unit displays the next macroblock of the non-reference picture. If decoding of the next macroblock is not completed, and the displaying unit displays the corresponding macroblock of the reference picture. In one embodiment, the reference picture is an I picture or a P picture, and the non-reference picture is a B picture.

18 Claims, 3 Drawing Sheets

METHOD AND APPARATUS FOR MPEG VIDEO PROCESSING

This application claims the benefit of Taiwan application Ser. No. 091100207, filed Jan. 9, 2002.

BACKGROUND OF THE INVENTION

1. Field of the Invention

The present invention relates to a method and an apparatus for the MPEG video processing, and more particularly relates to a method and an apparatus to display a non-reference picture (such as the B picture in the MPEG video) by referring to a reference picture (such as the I picture or P picture in the MPEG video).

2. Description of Related Art

The standard of the compression method of motion picture expert group (hereinafter MPEG) is widely used for video compression. For example, MPEG 1 is used for video compression in VCD, and MPEG 2 is used for video compression in DVD. The bit stream of the MPEG video includes a series of I pictures (Intra-coded pictures), P pictures (forward Predictive pictures), and B pictures (Bi-directionally predictive-coded pictures). I pictures are encoded as stand-alone still image. P pictures are encoded referring to the nearest I or P pictures by forward prediction processing. B pictures are encoded referring to the nearest past and future I and P pictures by bidirectional prediction. Therefore, I pictures and P pictures will be used as reference pictures when decoding other pictures, but B pictures will not be used for decoding other pictures.

FIG. 1 illustrates a block diagram of a video reproduction apparatus 100. The video reproduction apparatus 100 is capable of reproducing video data encoded with MPEG-1 or MPEG-2 standard, and is for example, a DVD player or a VCD player. The video reproduction apparatus 100 includes a MPEG decoder 110, a memory unit 120, and a displaying unit 130. The memory unit 120 includes a number of buffer regions. The MPEG decoder 110 receives the MPEG video bit stream, decodes the encoded video bit stream, and stores the decoded pictures into the buffer regions of the memory unit 120. The displaying unit 130 reads the decoded pictures from the buffer regions of the memory unit 120, and displays the decoded pictures to a screen terminal, such as a TV monitor. Since B pictures are not referred to when decoding other pictures, it is not necessary to store a whole B picture for later reference. The size of the buffer regions for storing B pictures is generally less than the size for storing a whole B picture so as to save memory. In such design, a portion of a B picture will be displayed after the portion of the B picture is decoded, instead that the whole B picture being displayed after the whole B picture is completed decoded.

However, a B picture may be displayed abnormally if the bandwidth of the memory unit is insufficient or if the decoding is delayed due to some decoding errors. The duration of displaying errors may be short, such as 1/60 second, but the viewer can still perceive and feel uncomfortable with the errors. In addition, when the decoding of a portion of the picture is delayed, the decoding of subsequent portions may also be affected, thereby deteriorate the picture displaying quality.

SUMMARY OF THE INVENTION

It is therefore an objective of the present invention to provide a method and an apparatus for the MPEG video processing, with the prevention of the above mentioned problems.

In accordance with the foregoing and other objectives, the present invention provides a method and an apparatus for generating and displaying n on-reference pictures (such as B pictures according to the MPEG standard). Such method and apparatus can generally be used in a video reproduction apparatus, for example, a VCD player or a DVD player. In the following disclosure, a method for generating and displaying a non-reference picture (such as a B picture) by referring to a reference picture (such as an I picture or a P picture) is proposed. The method includes a first step of decoding a row of macroblocks of the non-reference picture; a second step of displaying the row of macroblocks, a nd determining whether decoding of a next row of macroblocks of the non-reference picture is completed. If decoding of the next row of macroblocks is completed, then displaying the next row of macroblocks of the non-reference picture; if the decoding of the next row of macroblocks of the non-reference picture is not completed, then displaying a corresponding row of macroblocks of the reference picture.

A video reproduction apparatus according to one embodiment is also disclosed. The apparatus includes a video decoder and a displaying unit. The video decoder generates a non-reference picture (such as a B picture) on a macroblock-by-macroblock basis by referring to a reference picture (such as an I picture or a P picture). The displaying unit displays the non-reference picture on the macroblock-by-macroblock basis. The displaying unit further detects whether decoding of a next row of macroblocks of the non-reference picture is completed when displaying a current row of macroblocks. If decoding of the next row of macroblocks is completed, the displaying unit displays the next row of macroblocks; if decoding of the next row of macroblocks is not completed, then the displaying unit displays the corresponding row of macroblocks of the reference picture. The displaying unit displays the reference pictures and non-reference pictures to a screen terminal, such as a TV monitor.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The feature of the present invention is that when the decoding of one portion of the non-reference picture (such as the B picture according to the MPEG standard) is not completed in time, the corresponding portion of the reference picture (such as the I picture or the P picture according to the MPEG standard) is used instead. When the decoding of one portion of the non-reference picture is completed in time, the portion of the non-reference picture is used the same as in an ordinary operation. The portion of the reference picture or the corresponding portion of non-reference picture may be a set of macroblocks. In the following embodiment, the set of macroblocks contains a row of macroblocks. But it should be noted that each set of macroblocks may contain exactly one macroblock, a predetermined number of macroblocks, a row of macroblocks, or several rows of macroblocks. A macroblock is a fundamental unit to be decoded and displayed in a reference picture or a non-reference picture.

Figure 1:
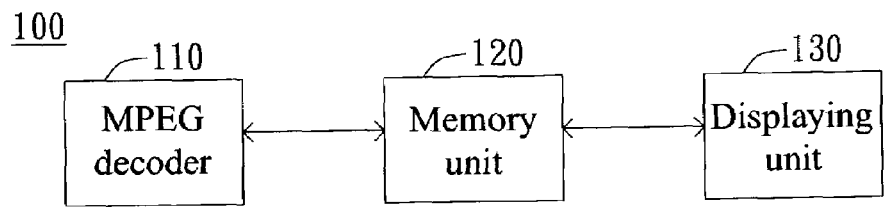
FIG. 1 is a block diagram of a video reproduction apparatus.
Figure 2:
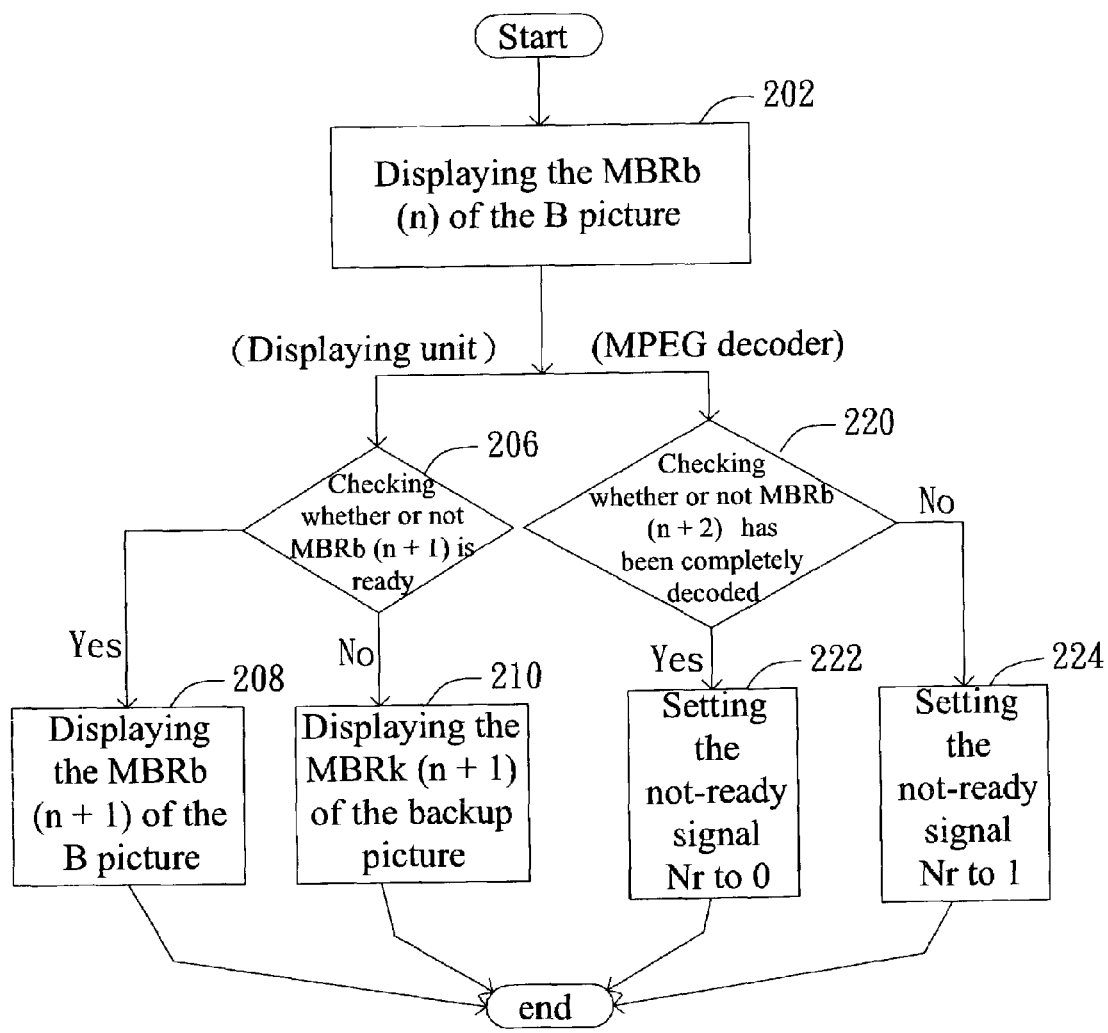
FIG. 2 is a flow chart of the method for processing MPEG video according to one embodiment of the invention.

FIG. 2 illustrates a flow chart of the method for processing MPEG video according to one embodiment of the invention. The method is to display MPEG video by modifying the B picture decoding process. First, in the step 202, the displaying unit 130 displays a current row of macroblocks, which is the nth row of macroblocks of the B picture and is denoted as MBRb(n). Then, in the step 206, the displaying unit 130 detects whether or not the decoding of the next row of macroblocks of the B picture is completed and the next row is ready to be displayed. The next row is the (n+1)th row of the B picture and is denoted as MBRb(n+1). In this step 206, the displaying unit 130 detects whether or not the decoding of the next row of the B picture is completed by a not-ready signal Nr provided by the MPEG decoder. If the not-ready signal Nr is a first value, such as 0, then the next row MBRb(n+1) is displayed, as shown in the step 208. If the not-ready signal Nr is a second value, such as 1, then the corresponding row MBRk (n+1) of the reference picture is displayed, as shown in the step 210. After the step 202, the MPEG decoder 110 detects whether or not a subsequent row MBRb (n+2) for the B picture, which is two rows ahead to the current row MBRb (n), is completely decoded, as shown in the step 220. I f the d ecoding has been completed, then the not-ready signal Nr is set to the first value, such as 0, as shown in the step 222. If the decoding of the row MBRb (n+2) is not yet completed, then the not-ready signal Nr is set to the second value, such as 1, as shown in the step 224.

Figure 3:
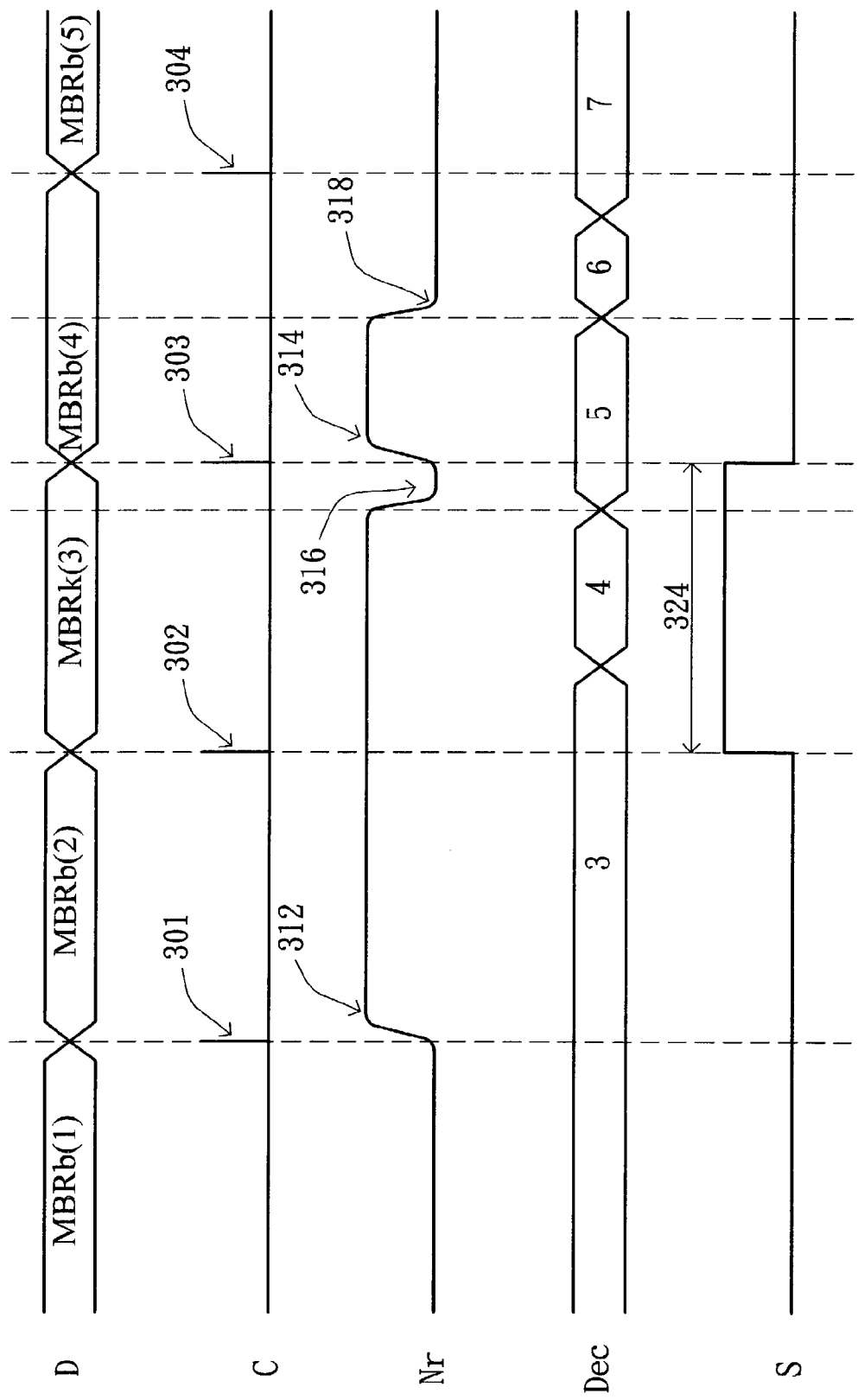
FIG. 3 is a timing diagram of the method for processing MPEG video according to the embodiment.

FIG. 3 is a timing diagram of this embodiment for processing the MPEG video. D denotes the current row of macroblocks which is currently displayed by the displaying unit 130. After the current row of macroblocks has been completely displayed, a display complete signal C and a location signal indicating a location of the next row of macroblocks are provided to the MPEG decoder 110. The display complete signal C is illustrated in this diagram as the numerals 301, 302, 303, and 304. At the same time, the displaying unit 130 checks the not-ready signal Nr. If the not-ready signal Nr is 0, it means the next row of macroblocks of the B picture to be displayed is ready, and accordingly the next row of macroblocks is displayed the same as in a ordinary procedure. If the not-ready signal Nr is 1, it means the next row of macroblocks of the B picture to be displayed is not ready, and then a switching signal S is set to 1, and the displaying unit 130 would display the corresponding row of macroblocks of the reference picture. The corresponding row of the reference picture is located at the location with respect to the same location of the next row of macroblocks, such as the the numeral 324 indicated in this diagram. The switching signal will return to 0 when the next row of macroblocks is completed in time and the not-ready signal Nr is 0.

The not-ready signal Nr is set by the MPEG decoder 110. When the MPEG decoder 110 receives the display complete signal C, the MPEG decoder 110 makes a comparison between the location of the next row to be displayed and the location of the decoding row which is currently being decoded by the MPEG decoder 110. The decoding row is denoted as Dec in FIG. 3. Once the decoding row Dec is found to be only one or even less than one row ahead to the next row to be displayed, the not-ready signal Nr is set to 1, indicated by numerals 312 and 314 in this diagram, so as to indicate that the row next to the current displayed row is not ready yet. The not-ready signal Nr is set to 0 when the decoding row Dec is found to be at least one row ahead to the next row to be displayed (that is, at least two rows ahead to the current row being displayed). For example, if the current row displayed is the kth row, then the not-ready signal Nr is set to 0 only when the decoding row Dec is at least the (k+2)th one, otherwise the not-ready signal Nr is maintained as 1.

Figure 4A:
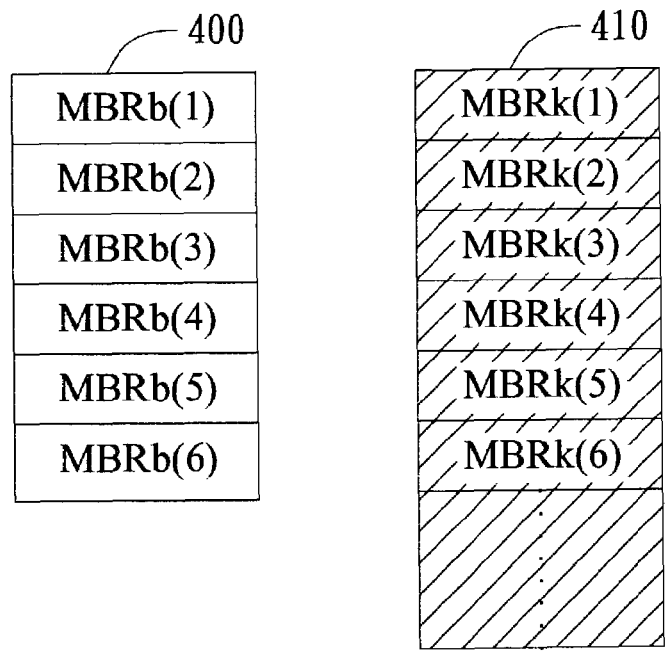
FIG. 4A is a drawing, schematically illustrating the buffer regions in the video reproduction apparatus of the embodiment.
Figure 4B:
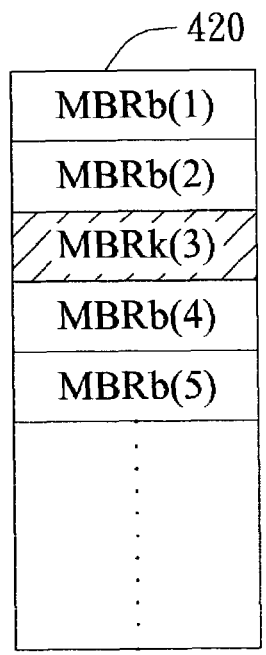
FIG. 4B is a drawing, schematically illustrating the displaying of the image of the embodiment.

FIG. 4A is a drawing illustrating the buffer regions in the memory unit 120 of the video reproduction apparatus 100 according to this embodiment. FIG. 4B is a drawing illustrating the displaying of a B picture 420. The buffer regions include the first buffer regions 400 for storing the B picture and the second buffer regions 410 for storing the reference picture. The reference picture may be an I picture or a P picture. To save the use of the memory capacity, the first buffer region 400 allocated for storing the B picture is less than the size for storing the whole B picture in this embodiment. For example, the first buffer region 400 in this embodiment has a memory size capable of storing six rows of macroblocks. Since the decoding of the 3rd row of macroblocks MBRb (3) of the B picture cannot be completed in time, the corresponding 3rd row MBRk (3) of the reference picture is used as a substitute. Since the difference of image content between the B picture and the reference picture is generally not too great (that's why the specific reference picture is used to help encode this B picture when encoding the MPEG video), such substitution is generally acceptable in most circumstances.

The foregoing embodiment of the present invention has disclosed a method and apparatus for displaying the B pictures of the M PEG image, which can prevent the occurrence of abnormal picture displaying caused by insufficient decoding speed. However, this invention can also be used in decoding non-reference pictures in other video standards where the non-reference pictures are not used as a reference to decode other pictures.

The invention has been described using exemplary preferred embodiments. However, it is to be understood that the scope of the invention is not limited to the disclosed embodiment. On the contrary, it is intended to cover various modifications and similar arrangements. The scope of the claims, therefore, should be accorded the broadest interpretation so as to encompass all such modifications and similar arrangements.

What is claimed is:

1. A video reproduction apparatus, comprising:
    a memory unit;
    a video decoder for generating a reference picture and storing the reference picture into the memory unit, and for generating a non-reference picture by referring to the reference picture stored in the memory unit, wherein the video decoder provides a not-ready signal to indicate whether decoding of a next set of macroblocks of the non-reference picture is completed;
    a displaying unit for displaying the non-reference picture on a set of macroblocks basis;
    wherein when the displaying unit displaying a current set of macroblocks of the non-reference picture, the displaying unit also detects whether the decoding of the next set of macroblocks of the non-reference picture is completed according to the not-ready signal provided by the video decoder, the displaying unit displays the next set of macroblocks of the non-reference picture if decoding of the next set of macroblocks is completed, and the displaying unit displays the corresponding set of macroblocks of the reference picture if decoding of the next set of macroblocks is not completed;

wherein the not-ready signal provided by the video decoder is generated from the comparison between a location of the next set of macroblocks to be displayed and a location of a decoding set of macroblocks which is currently being decoded by the video decoder.

2. The apparatus of claim 1, wherein each time the displaying unit has finished displaying one set of macroblocks, the video decoder will receive a display complete signal and a location signal indicating a location of the next set of macroblocks.

3. The apparatus of claim 1, wherein if the decoding set of macroblocks is at least two sets of macroblocks ahead from the next set of macroblocks then the not-ready signal is set to a first value, and if it is not then the not-ready signal is set to a second value.

4. The apparatus of claim 1, wherein the non-reference picture is a B picture, and the reference picture is an I picture or a P picture.

5. The apparatus of claim 1, wherein each set of macroblocks comprises at least a row of macroblocks.

6. The apparatus of claim 1, further comprising a memory unit for temporarily storing the reference picture.

7. A method for generating and displaying a non-reference picture by referring to a reference picture, comprising:

decoding a set of macroblocks of the non-reference picture and providing a not-ready signal to indicate whether decoding of a next set of macroblocks of the non-reference picture is completed;

by a displaying unit:

displaying the set of macroblocks, and determining whether decoding of the next set of macroblocks of the non-reference picture is completed according to the not-ready signal provided by the video decoder;

displaying the next set of macroblocks of the non-reference picture if the decoding of the next set of macroblocks is completed; and displaying a corresponding set of macroblocks of the reference picture if the decoding of the next set of macroblocks of the non-reference picture is not completed wherein the not-ready signal provided by the video decoder is generated from the comparison between a location of the next set of macroblocks to be displayed and a location of a decoding set of macroblocks which is currently being decoded by the video decoder.

8. The method of claim 7, wherein the non-reference picture is a B picture, and the reference picture is an I picture or a P picture.

9. The method of claim 7, wherein each set of macroblocks comprises at least a row of macroblocks of the non-reference picture.

10. The method of claim 7, wherein the method is implemented in a macroblock-based video reproduction apparatus.

11. The method of claim 7, wherein the method is implemented in an MPEG-1 or an MPEG-2 video reproduction apparatus.

12. The method of claim 7, wherein the method is implemented in a VCD player or a DVD player.

13. A video reproduction apparatus, comprising:

a video decoder, for receiving a video bit stream and generating a non-reference picture on a macroblock-by-macroblock basis by referring to a reference picture, wherein the video decoder provides a not-ready signal to indicate whether decoding of a next set of macroblocks of the non-reference picture is completed;

a displaying unit for receiving and displaying the non-reference picture on the macroblock-by-macroblock basis, wherein the displaying unit further detects whether the decoding of the next macroblock of the non-reference picture is completed according to the not-ready signal provided by the video decoder when displaying a current macroblock, the displaying unit displays the next macroblock of the non-reference picture if decoding of the next macroblock is completed, and the displaying unit displays the corresponding macroblock of the reference picture if decoding of the next macroblock is not completed;

wherein the not-ready signal provided by the video decoder is generated from the comparison between a location of the next macroblock to be displayed and a location of a decoding macroblock which is currently being decoded by the video decoder.

14. The apparatus of claim 13, wherein each time the displaying unit has finished displaying the current macroblock, the video decoder will receive a display complete signal and a location signal indicating a location of the next macroblock.

15. The apparatus of claim 13, wherein if the decoding macroblock is at least two macroblocks ahead from the next macroblock to be displayed, then the not-ready signal is set to a first value, and if it is not then the not-ready signal is set to a second value.

16. The apparatus of claim 13, wherein the non-reference picture is a B picture, and the reference picture is an I picture or a P picture.

17. The apparatus of claim 13, further comprising a memory unit for temporarily storing the reference picture.

18. The apparatus of claim 17, wherein the memory unit further stores the non-reference picture.

* * * * *